United States Patent
Rodgers (10) Patent No.: US 9,811,330 B2
(45) Date of Patent: Nov. 7, 2017

(54) METHOD AND SYSTEM FOR VERSION CONTROL IN A REPROGRAMMABLE SECURITY SYSTEM

(75) Inventor: Stephane Rodgers, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2492 days.

(21) Appl. No.: 11/758,387

(22) Filed: Jun. 5, 2007

(65) Prior Publication Data
US 2008/0086517 A1  Apr. 10, 2008

Related U.S. Application Data

(60) Provisional application No. 60/828,566, filed on Oct. 6, 2006.

(51) Int. Cl.
G06F 3/00 (2006.01)
G06F 9/445 (2006.01)
G06F 21/57 (2013.01)

(52) U.S. Cl.
CPC ............... *G06F 8/65* (2013.01); *G06F 21/57* (2013.01)

(58) Field of Classification Search
CPC .................................. G06F 21/57; G06F 8/65
USPC ........ 380/201–204, 251; 705/57; 726/31–33, 726/26, 30; 713/187–189, 193–194; 717/168–178
See application file for complete search history.

(56) References Cited

U.S. PATENT DOCUMENTS

| | | | | |
|---|---|---|---|---|
| 6,073,123 A * | 6/2000 | Staley | | 705/58 |
| 2003/0163508 A1* | 8/2003 | Goodman | | G06F 8/67 718/100 |
| 2004/0003244 A1* | 1/2004 | England | | G06F 21/10 713/168 |
| 2004/0086120 A1* | 5/2004 | Akins et al. | | 380/240 |
| 2006/0005046 A1* | 1/2006 | Hars | | G06F 21/572 713/191 |
| 2006/0015754 A1* | 1/2006 | Drehmel | | G06F 21/72 713/193 |
| 2007/0022186 A1* | 1/2007 | Chen | | H04L 67/1097 709/220 |
| 2009/0235149 A1* | 9/2009 | Frohwein | | G06F 17/30867 715/205 |

(Continued)

*Primary Examiner* — Baotran N To
*Assistant Examiner* — Sayed Beheshti Shirazi
(74) *Attorney, Agent, or Firm* — Sterne, Kessler, Goldstein & Fox PLLC (57) ABSTRACT

Methods and systems for securing code in a reprogrammable security system are provided and may comprise detecting when a prior version of code is copied over a subsequent version of code. Operations within the system may be controlled based upon detection of the prior version of code. A unique version identifier may be associated with each successive version of code. The system may compare instances of unique version identifier from varied storage mechanisms on a device which may include flash memory, latch memory and one time programmable memory. The same instances of unique version identifier may be compared with a unique version identifier instance independently received from an external entity. When a comparison reveals a prior version of code copied over a subsequent version of code the system may conduct operations specified for a security breach.

32 Claims, 5 Drawing Sheets

(56) References Cited

U.S. PATENT DOCUMENTS

| | | | |
|---|---|---|---|
| 2010/0023874 A1* | 1/2010 | Frohwein | G06F 3/048 715/747 |
| 2011/0216340 A1* | 9/2011 | Yoshida | G06F 3/1205 358/1.13 |
| 2012/0233604 A1* | 9/2012 | Jibbe | G06F 8/665 717/168 |

* cited by examiner

METHOD AND SYSTEM FOR VERSION CONTROL IN A REPROGRAMMABLE SECURITY SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/828,566, filed on Oct. 6, 2006, which is hereby incorporated herein by reference in its entirety.

FIELD OF THE INVENTION

Certain embodiments of the invention relate to secure systems. More specifically, certain embodiments of the invention relate to a method and system for version control in a reprogrammable security system.

BACKGROUND OF THE INVENTION

Various security mechanisms may be implemented to protect reprogrammable systems deployed in the field such as set top boxes in a video distribution system. Occasionally, entry points to restricted-access functionality on such systems may be neglected by resident security code and/or circuitry. Unauthorized users may discover ways to navigate around existing security obstacles and gain prohibited access. In a reprogrammable security system, security software may be updated with subsequent versions of code that correct errors found in prior versions. Security code updates may be distributed by a control center and downloaded in the field. Further access by unauthorized users may require new approaches to the problem.

It may be difficult for an unauthorized user to gain restricted access to a device in the field by making modifications to resident security code. Such an attempt would require extensive knowledge and skill on the part of the user due to cryptographic applications. An alternate means may be to make a copy of a prior version of security code whose design is vulnerable to breach, and download it onto the device over a subsequent version of improved code. The system may perceive the copy to be a properly authorized unit of code and may accept it readily into the system. With the prior version of code in place, the unauthorized user may again gain access using the original method to circumvent existing security obstacles. New techniques for securing reprogrammable systems may be needed to prevent future incursions.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for version control in a reprogrammable security system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for version control in a reprogrammable security system. Aspects of the invention may comprise a reprogrammable security processor that may be communicatively coupled with an external source of command and control. The security processor and the external source of command and control may enable detection of an invalid version of code resident in a security processor memory. The invalid version of code may for example, be a prior version of code that is copied and downloaded over a subsequent version of code. The security processor may utilize historical records of versions of downloaded code from a plurality sources to detect the resident copy of the prior version of code. The prior version of code may be deemed an invalid version of code and its presence may be considered a security breach. The security processor may take action to avoid execution of the invalid version of code.

Figure 1A:
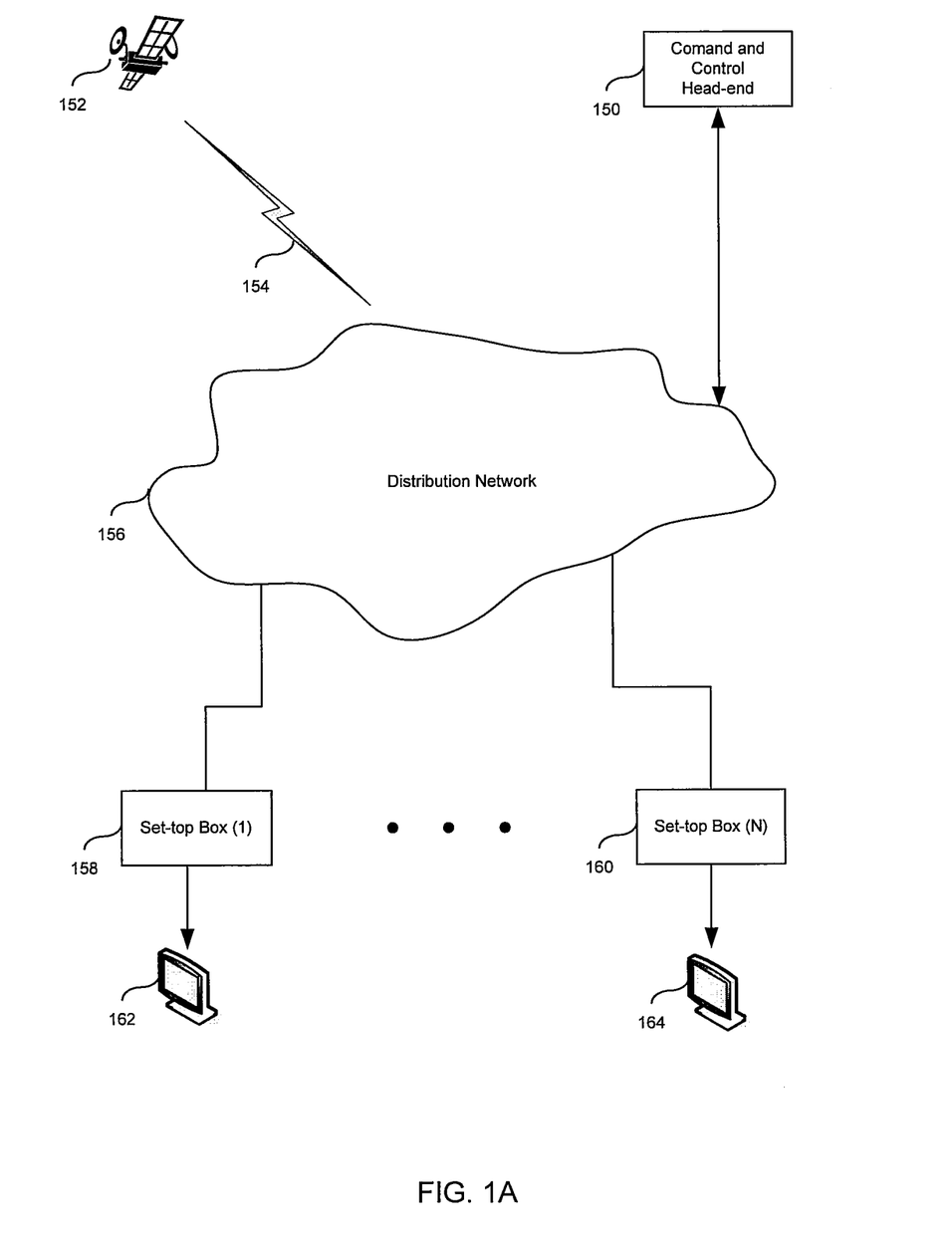
FIG. 1A is a block diagram of an exemplary reprogrammable security system that may utilize version control, in accordance with an embodiment of the invention.

FIG. 1A is a block diagram of an exemplary communications system that may utilize a reprogrammable security system with version control, in accordance with an embodiment of the invention. Referring to FIG. 1A, there is shown a video distribution system that may comprise a command and control head-end 150, a communications satellite 152, a satellite communications link 154, a communications distribution network, a plurality of set top boxes (1) 158 through (N) 160, television units 162 and 164.

The command and control head-end 150 may comprise suitable circuitry, logic and/or code and may be adapted to distribute video and control signals via the communications distribution network 156 to a plurality of set top boxes (1) 158 through (N) 160. The command and control head-end 150 may distribute code utilized for security operations within the plurality of set top boxes (1) 158 through (N) 160.

The communications distribution network 156 may comprise suitable circuitry, logic and/or code and may be adapted to provide links between various originating and terminating points for transmission of signals. The communications distribution network 156 may transport signals carrying code utilized for security operations within the plurality of set top boxes (1) 158 through (N) 160 from the command and control head-end 150.

The communications satellite 152 and corresponding satellite communications link 154 may comprise suitable circuitry, logic and/or code and may be adapted to provide uplink and downlink wireless transmissions for the distribution network 156. The communications satellite 152 uplink and downlink wireless transmissions may transport signals carrying code utilized for security operations within the plurality of set top boxes (1) 158 through (N) 160 from the command and control head-end 150.

The plurality of set top boxes (1) 158 through (N) 160 may comprise suitable circuitry, logic and/or code and may be adapted to receive and transmit signals from/to the command and control head-end 150. The plurality of set top boxes (1) 158 through (N) 160 may comprise suitable circuitry, logic and/or code for processing, storing and communicating information within the set top box. The plurality of set top boxes (1) 158 through (N) 160 may comprise a reprogrammable security system that may enable security operations for protected functionality therein. The plurality of set top boxes (1) 158 through (N) 160 may be communicatively coupled with the distribution network 156 and corresponding television units shown as 162 and 164.

A plurality of television units shown as 162 and 164 are communicatively coupled with corresponding set top boxes. Television units receive and display decrypted signals from the set top boxes.

In operation, new versions of security processor code may be distributed by the command and control head-end 150 and transported via communications signals to the plurality of set top boxes (1) 158 through (N) 160 via one or more of the communications satellite 152, the satellite communications link 154, and the communications distribution network 156. The plurality of set top boxes (1) 158 through (N) 160 may download the code and perform security operations according to various embodiments of the invention.

Figure 1B:
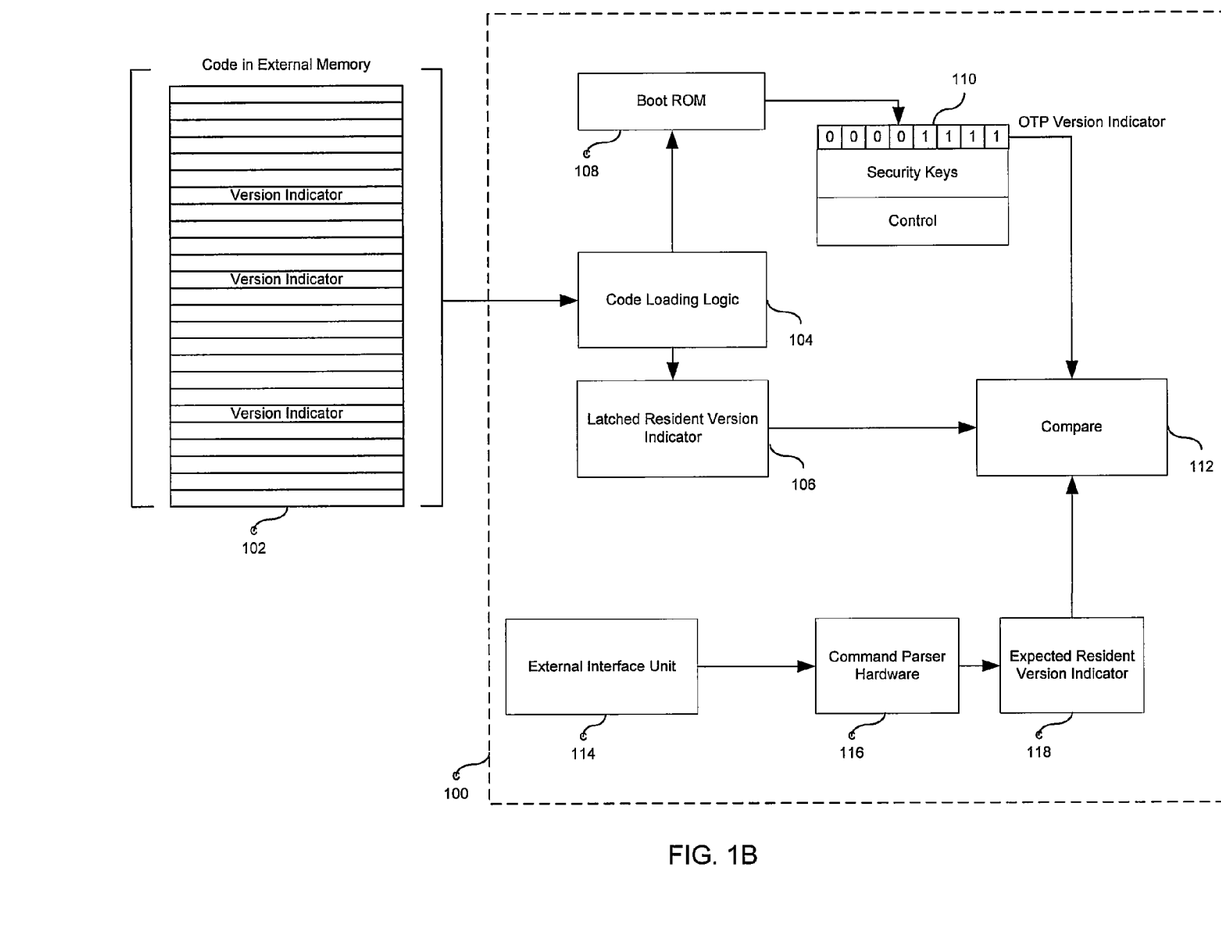
FIG. 1B is a block diagram that illustrates an exemplary reprogrammable security system that enables version control, in accordance with an embodiment of the invention.

FIG. 1B is a block diagram that illustrates an exemplary reprogrammable security processor that enables detection of a prior version of code, in accordance with an embodiment of the invention. Referring to FIG. 1, there is shown a reprogrammable security processor 100 that may comprise an external flash memory 102, a code loading unit 104, a latch memory 106, a bootable read only memory (ROM) 108, a one time programmable (OTP) memory 110, a compare unit 112, an external interface unit 114, a command parser 116, and a memory 118.

The external flash memory 102 may comprise suitable storage for security processor code. The version of code resident within flash memory 102 may be identified by an embedded version identifier that may be positioned at a plurality of pre-determined locations within the code. In addition, the security processor code may be encrypted such that the version number may not be apparent to an outside observer and thus not subject to change. The external flash memory 102 may be communicatively coupled to the code loading unit 104.

The code loading unit 104 may comprise suitable circuitry, logic and/or code and may be adapted to load and decrypt the code resident in external flash memory 102 and extract the resident code version identifier embedded within the plurality of pre-determined locations. The code loading unit 104 may be adapted to exchange information with the boot ROM 108 and the latch memory 106.

The latch memory 106 may comprise storage for the version identifier embedded in the code resident in external flash memory 102. The resident code version identifier may be extracted and latched in the latch memory 106. Logic around the latch memory may check to see that the plurality of code version numbers embedded in the code all have the same value, thereby preventing a single "lucky guess" by a hacker trying to modify said version number. The latch memory 106 may be communicatively coupled with the code loading unit 104 and the compare unit 112.

The boot ROM 108 may comprise suitable circuitry, logic and/or code to convert a bit in the OTP 110 from zero to one. The boot ROM 108 may be communicatively coupled with the code loading unit 104 and the OTP 110.

The OTP 110 may comprise suitable storage for an OTP version identifier wherein the OTP version identifier may be a binary number initialized with zeros and may be increased in value to match a subsequent code version identifier by changing bits from zero to one but may not be changed to represent a prior code version identifier by reversing the bit value from one to zero. The OTP 110 may be communicatively coupled with the boot ROM 108 and the compare unit 112.

The compare unit 112 may be communicatively coupled with the latch memory 106, the OTP 110 and the memory 118 and may contain suitable circuitry, logic and/or code to compare version identifiers from a plurality of memory units.

The external interface unit 114 may be communicatively coupled with one or more external sources of code and commands for example a command and control head-end. The external interface unit 114 may comprise a decryption unit. The external interface 114 may receive streams of data from the one or more external sources of code and commands that may contain an expected resident code version identifier. The expected resident code version identifier may indicate which version of security processor code the reprogrammable security system expects to be resident in the flash memory 102 of security processor 100.

The command parser 116 may be communicatively coupled with the external interface unit 114 and the memory 118. The command parser 116 may contain suitable circuitry, logic and/or code to parse the expected resident code version identifier from the received streams of data from the one or more external sources of code and commands.

The memory 118 may be communicatively coupled with the command parser and the compare unit 112 and may contain suitable storage for the expected resident code version identifier.

In operation, security processor code may be downloaded into the external flash memory 102 and may comprise a corresponding version identifier embedded within a plurality of pre-determined locations. Two or more instances of the corresponding version identifier embedded within a plurality of pre-determined locations may be extracted and compared with each other. If any of the two or more instances of the embedded corresponding version identifiers do not match, the security processor 100 may enter a state of security breach.

The corresponding version identifier from the code resident in external flash memory 102 may be latched in latch memory 106. The latched resident code version identifier may be compared with the OTP version identifier in OTP 110. When the latched resident code version identifier represents a version of code subsequent to the OTP version identifier, the OTP version identifier may be increased to match the latched resident code version identifier. When the resident code version identifier represents a version of code prior to the OTP version identifier, the security processor 100 may consider this a breach in security and may proceed with operations accordingly; for example, the security processor 100 may report a security fault, may halt operations or may request a software update. Exemplary code version identifiers may comprise alphabetic, numeric, alphanumeric characters, and/or other codes.

The external interface unit 114 may receive streams of data comprising commands which may or may not be embedded in video, audio or data. These commands may have an expected resident code version identifier. The external interface 114 may decrypt the incoming data streams. The command parser 116 may receive the streams of data from the external interface 114, may parse the expected resident code version identifier from the received streams of data and may store the expected resident code version identifier in memory 118. The security processor 100 may compare the received expected resident code version identifier with one or more of the latched resident code version identifier and the OTP version identifier. When the resident code version identifier represents a version of code prior to the received expected resident code version identifier, the security processor 100 may process a breach in security and may proceed accordingly; for example, the security processor 100 may request a software update, may report a security fault, and may halt operations.

Figure 2A:
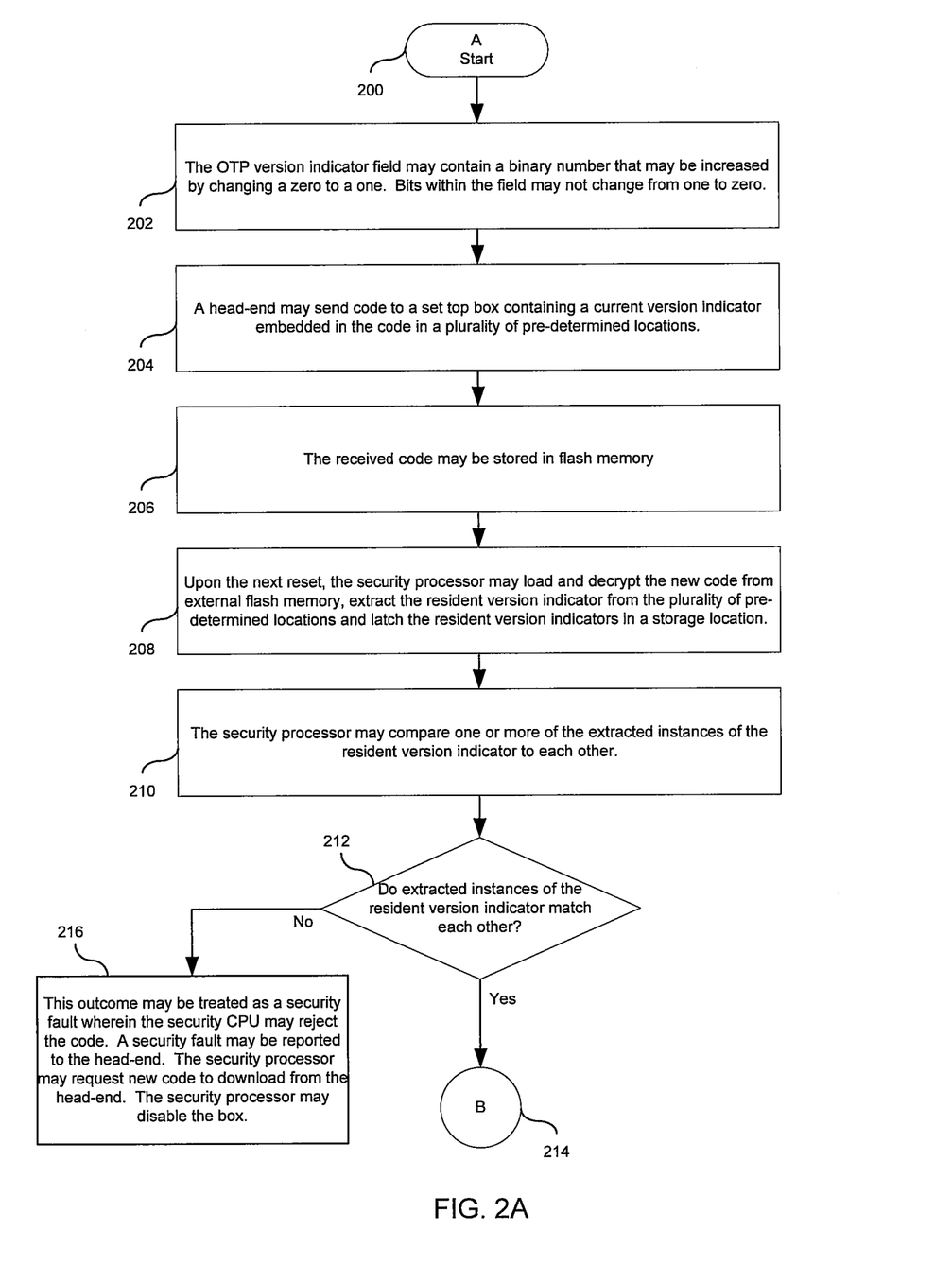
FIG. 2A is a flow diagram illustrating exemplary steps for version control in a reprogrammable security system, in accordance with an embodiment of the invention.

FIG. 2A is a flow chart illustrating exemplary steps for version control in a reprogrammable security system, in accordance with an embodiment of the invention. Referring to FIG. 2A, step 200 refers to the beginning of security operations on a reprogrammable security processor 100 shown in FIG. 1B. In step 202, a one time programmable (OTP) version identifier in OTP 110 may initially contain zeros. In an exemplary embodiment of the invention, the OTP version identifier may be a binary number that may be increased to match a latched resident code version identifier by changing bits from zero to one but not from one to zero. Other methods of tracking the code version may be utilized without departing from the scope of the invention, Notwithstanding, in step 204, an external source of code and commands, for example a head-end, may send code to a set top box wherein a corresponding code version identifier may be embedded within the code in a plurality of pre-determined locations The embedded corresponding code version identifier may be encrypted along with the code. In step 206, the received code may be stored in an external flash memory 102. In step 208, upon reset of the set top box, the security processor 100 may load the resident code from the external flash memory via the code loading unit 104, extract and decrypt the corresponding code version identifier from the plurality of pre-determined locations within the resident code and may latch the resident code version identifiers in latch memory 106.

In step 210, the security processor 100 may compare two or more of the extracted instances of the resident code version identifier to each other. In step 212, if the extracted resident code version identifiers match each other, the process may proceed to step 214. In step 212, If the extracted resident code version identifiers do not match each other, this outcome may be treated as a breach in security wherein for example, one or more of the following measures may be taken: the security processor 100 may reject the resident code and prevent execution of the resident code, a security fault may be reported to the head-end, the security processor 100 may download a subsequent version of code, the security processor 100 may disable one or more applications in the system.

Figure 2B:
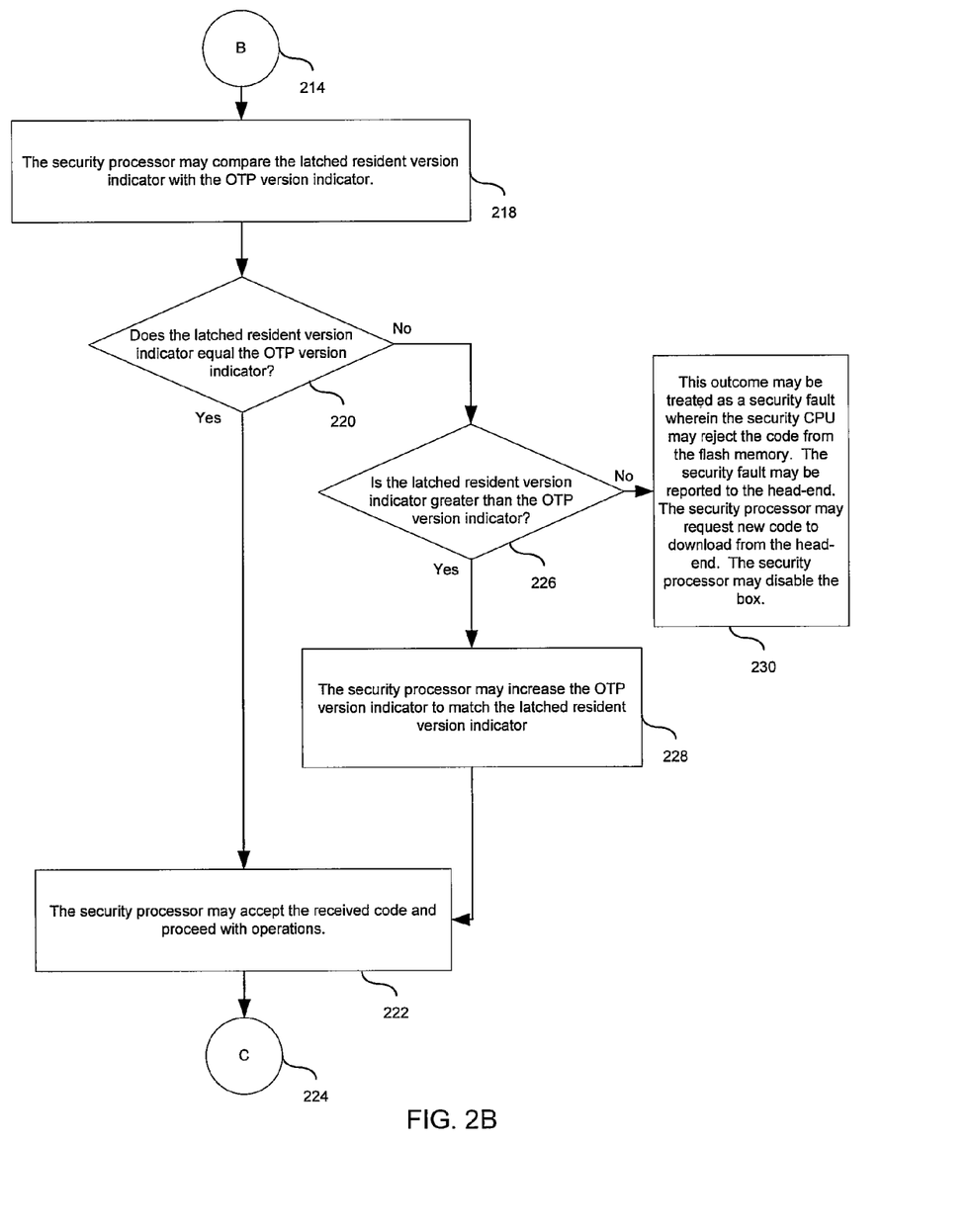
FIG. 2B is a continuation of the flow diagram in FIG. 2A, illustrating exemplary steps for version control in a reprogrammable security system, in accordance with an embodiment of the invention.

FIG. 2B is a flow chart illustrating exemplary steps for version control in a reprogrammable security system, in accordance with an embodiment of the invention. Referring to FIG. 2B, step 214 is a continuation directive from the flow chart in FIG. 2A. In step 218, the security processor 100 may compare the latched resident code version identifier to the OTP version identifier. In step 220, if the latched resident code version identifier is equal to the OTP version identifier, the process may proceed to step 222. In step 222, the resident code may be accepted and operations may proceed to step 224 without intervention. In step 220, if the latched resident code version identifier does not equal the OTP version identifier, the process may proceed to step 226. In step 226, if the latched resident code version identifier is greater than the OTP version identifier, the process may proceed to step 228. In step 228, the OTP version identifier may be increased to match the latched resident code version identifier and the process may proceed to step 222. In step 226, if the latched resident code version identifier is less than the OTP version identifier the process may proceed to step 230. In step 230, the security processor 100 may treat the outcome of step 226 as a breach in security wherein, for example, one or more of the following measures may be taken: the security processor 100 may reject the resident code and prevent execution of the resident code, a security fault may be reported to the head-end, the security processor may download a subsequent version of code, the security processor 100 may disable one or more applications in the system.

Figure 2C:
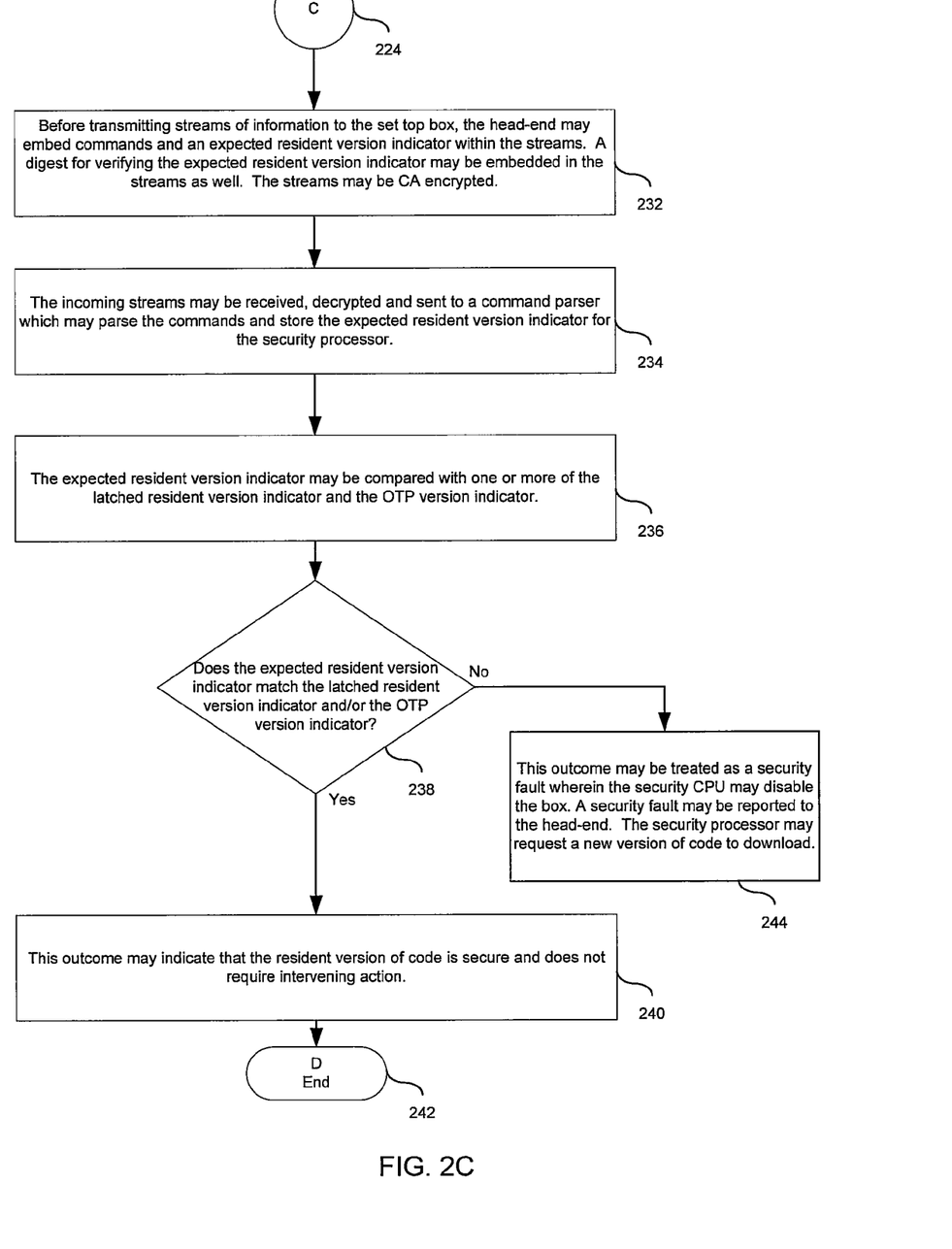
FIG. 2C is a continuation of the flow diagram in FIG. 2B, illustrating exemplary steps for version control in a reprogrammable security system, in accordance with an embodiment of the invention.

FIG. 2C is a flow chart illustrating exemplary steps for version control in a reprogrammable security system in accordance with an embodiment of the invention. Referring to FIG. 2C, step 224 is a continuation directive from the flow chart in FIG. 2B. In step 232, streams of information which may be CA encrypted may be sent from the head-end to the security processor. The streams of information may comprise commands and an expected resident code version identifier for the security processor. A digest for verifying the received expected resident code version identifier may be embedded within the streams of information as well. In step 234, the incoming streams of information may be received by an external interface unit 114, decrypted and sent to a command parser 116. The command parser 116 may parse the commands and expected resident code version identifier from the streams of information and store the expected resident code version identifier in memory 118. In step 236, the expected resident code version identifier may be compared with the latched resident code version identifier. The expected resident code version identifier may be compared with the OTP version identifier. In step 238, if the expected resident code version identifier matches the latched resident code version identifier and the OTP version identifier, operations may proceed to step 240.

In step 240, the security processor 100 may determine that the resident version of code is secure and operations may continue to step 242 without taking intervening action. In step 238, if the expected resident code version identifier does not match the latched resident code version identifier and/or the OTP version identifier, operations may proceed to step 244. In step 244, the security processor 100 may treat the outcome of step 238 as a breach in security wherein, for example, one or more of the following measures may be taken: the security processor 100 may reject the resident code and prevent execution of the resident code, a security fault may be reported to the head-end, the security processor 100 may download a subsequent version of code, the security processor may disable one or more applications in the system.

The method and system illustrated in FIG. 1B, enables version control in a reprogrammable security system and may protect against a breach of security. The breach of security may occur when an unauthorized user attempts to download a copy of a prior version of code, containing security flaws, over a subsequent version of code. The prior version of code may be detected by comparing historical code version identifiers from a plurality of records. For example, a one time programmable (OTP) memory 110 may contain a binary number that serves as a code version identifier. The OTP version identifier may be changed to represent subsequent versions of downloaded code but may not be changed in the direction of prior versions of code.

The version control method may comprise downloading into flash memory 102, code wherein a corresponding code version identifier is embedded within a plurality of locations. Two or more instances of the embedded corresponding version identifiers may be extracted from the code by the code loading logic 104 and may be compared with each other. If any of the two or more instances of the embedded corresponding version identifiers do not match, the security processor 100 may detect a security breach. The security processor 100 may intervene with one or more of the following actions: reject the code resident in flash memory 102 and prevent execution of the code, report a security fault to the head-end, download a subsequent version of code and disable one or more applications in the system.

The corresponding version identifier may be latched in latch memory 106 to represent the version of code resident in flash memory 102. The latched resident code version identifier and the OTP version identifier stored in OTP 110 may be compared within the compare unit 112. If the latched resident code version identifier represents a version subsequent to the OTP version identifier, the OTP version identifier in OTP 110 may be increased to match the latched resident code version identifier. When the latched resident code version identifier and the OTP version identifier represent the same version of security processor code, no intervening action may be required. If the latched resident code version identifier represents a version of security processor code prior to the OTP version identifier, the security processor 100 may detect that a security breach has occurred. The security processor 100 may intervene with one or more of the following actions: reject the code resident in flash memory 102 and prevent execution of the code, report a security fault to the head-end, download a subsequent version of code and disable one or more applications in the system.

In another aspect of the invention, the external interface unit 114 may receive streams of information from the head-end comprising commands and a version identifier representing the version of code it expects to be resident on the security processor 100. The security processor 100 may utilize the expected resident code version identifier to foil attempts at unauthorized access wherein an unauthorized user may have prevented an increase in the OTP version identifier when a new version of code may have been downloaded, thus enabling the unauthorized user to download an earlier version of code that matches an old OTP version identifier. In this regard, the head-end may send the expected resident code version identifier independent of any downloaded code and the old OTP version identifier may be detected.

Accordingly, the expected resident code version identifier may be parsed from the received streams of information by the command parser 116 and stored in the memory 118. The expected resident code version identifier may be compared in the compare unit 112 with one or more of the latched resident code version identifier from latch memory 106 and the OTP version identifier from OTP 110. If the compared identifiers represent the same version of security processor code, no intervening action is required. If the compared identifiers represent different versions of security processor code, the security processor 100 may detect a security breach. The security processor 100 may intervene with one or more of the following actions: reject the code resident in flash memory 102 and prevent execution of the code, report a security fault to the head-end, download a subsequent version of code and disable one or more applications in the system.

Aspects of the invention may be found in a method and system for detecting in a reprogrammable security system, instances when a prior version of code is copied over a subsequent version of code, and for controlling operations of the security system based on the detection as is shown in FIG. 1B block 100. In this regard, each of the prior version of code and the subsequent version of code may comprise a corresponding unique code version identifier embedded therein. Additionally, the corresponding unique code version identifier for each of the prior version of code and subsequent version of code may be embedded in a plurality of locations therein as shown in block 102 of FIG. 1. The corresponding unique code version identifier for each prior version of code and subsequent version of code may be encrypted within corresponding ones of the prior version of code and the subsequent version of code. Also, two or more instances of unique code version identifier for corresponding ones of prior version of code and subsequent version of code may be compared with each other. Based on the comparison, a security breach may be detected when any of the two or more instances of unique code version identifiers do not match.

The corresponding unique code version identifier for corresponding ones of the prior version of code and the subsequent version of code may be latched in memory block 106. In this regard, the latched corresponding unique code version identifier stored in memory 106 and a stored one time programmable (OTP) unique code version identifier that corresponds to the prior version of code or the subsequent version of code stored in block 110, may be compared within the comparator block 112. Accordingly, the OTP unique code version identifier stored in block 110 may be changed to match the corresponding unique code version identifier latched in block 106 when the latched corresponding unique code version identifier indicates a subsequent version of code. If the result of the comparison shows that the stored OTP unique version identifier indicates a subsequent version of code, a security breach may be detected.

Within compare block 112, one or more of the stored OTP unique code version identifier from block 110 and the latched corresponding unique code version identifier from block 106, may be compared with a system reference code version identifier from memory 118. As a result of the comparison, a security breach may be detected when the system reference code version identifier indicates a subsequent version of code.

Certain embodiments of the invention may comprise a machine-readable storage having stored thereon, a computer program having at least one code section for version control in a reprogrammable security system, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for securing executable code in a system, the method comprising:
   in a reprogrammable security system which previously utilized a prior version of executable code:
      receiving a subsequent version of executable code, wherein said subsequent version of executable code comprises a corresponding unique code version identifier embedded therein;
      detecting in said reprogrammable security system, instances when said prior version of executable code is copied over at least a portion of said subsequent version of executable code, wherein said detecting is based on said corresponding unique code version identifier;
      controlling operations of said reprogrammable security system based on said detection;
      receiving commands from an external entity that include a unique code version identifier which corresponds to an externally expected version of executable code resident on said reprogrammable security system; and
      detecting a security breach based on said unique code version identifier which corresponds to said externally expected version of executable code.

2. The method according to claim 1, wherein said prior version of executable code comprises a corresponding unique code version identifier embedded therein.

3. The method according to claim 2, wherein said corresponding unique code version identifier for each of said prior version of executable code and said subsequent version of executable code is embedded in a plurality of locations therein.

4. The method according to claim 3, wherein said corresponding unique code version identifier for each of said prior version of executable code and said subsequent version of executable code is encrypted within corresponding ones of said prior version of executable code and said subsequent version of executable code.

5. The method according to claim 3, further comprising comparing two or more instances of said unique code version identifier for corresponding ones of said prior version of executable code and said subsequent version of executable code.

6. The method according to claim 5, further comprising detecting a further security breach when said two or more instances of said unique code version identifier for corresponding ones of said prior version of executable code and said subsequent version of executable code do not match.

7. The method according to claim 2, further comprising latching said corresponding unique code version identifier from corresponding ones of said prior version of executable code and/or said subsequent version of executable code in memory.

8. The method according to claim 7, further comprising comparing said latched corresponding unique code version identifier with a stored one time programmable (OTP) unique code version identifier that corresponds to said prior version of executable code or said subsequent version of executable code.

9. The method according to claim 8, further comprising changing said stored OTP unique code version identifier to match said latched corresponding unique code version identifier when said latched corresponding unique code version identifier indicates a subsequent version of executable code.

10. The method according to claim 8, further comprising detecting a further security breach when said stored OTP unique version identifier indicates a subsequent version of executable code.

11. The method according to claim 1 wherein said commands and a digest are embedded in one or more video and/or audio streams prior to Conditional Access (CA) scrambling on said external entity.

12. The method according to claim 11, further comprising CA descrambling of said one or more video and/or audio streams of information comprising said commands and digest on said reprogrammable security system.

13. The method according to claim 12, further comprising verifying said received commands and said digest with a key stored internally on said reprogrammable security system.

14. The method according to claim 13, further comprising latching said externally expected code version identifier from said received commands on said reprogrammable security system.

15. The method according to claim 14, further comprising comparing said latched externally expected code version identifier with a code version identifier internally extracted from executable code resident on said reprogrammable security system.

16. The method according to claim 15, wherein detecting said security breach comprises determining when said latched externally expected code version identifier does not match said internally extracted code version identifier on said reprogrammable security system.

17. A system for securing executable code, said system comprising:
   one or more circuits for use in a reprogrammable security system which previously utilized a prior version of executable code, said one or more circuits configured to, at least:
   receive a subsequent version of executable code, wherein said subsequent version of executable code comprises a corresponding unique code version identifier embedded therein;
   detect in said reprogrammable security system, instances when said prior version of executable code is copied over at least a portion of said subsequent version of executable code, wherein said detection is based on said corresponding unique code version identifier;
   control operations of said reprogrammable security system based on said detection;
   receive commands from an external entity that include a unique code version identifier which corresponds to an externally expected version of executable code resident on said reprogrammable security system; and
   detect a security breach based on said unique code version identifier which corresponds to said externally expected version of executable code.

18. The system according to claim 17, wherein said prior version of executable code comprises a corresponding unique code version identifier embedded therein.

19. The system according to claim 18, wherein said corresponding unique code version identifier for each of said prior version of executable code and said subsequent version of executable code is embedded in a plurality of locations therein.

20. The system according to claim 19, wherein said corresponding unique code version identifier for each of said prior version of executable code and said subsequent version of executable code is encrypted within corresponding ones of said prior version of executable code and said subsequent version of executable code.

21. The system according to claim 19, wherein said one or more circuits are further configured to compare two or more instances of said unique code version identifier for corresponding ones of said prior version of executable code and said subsequent version of executable code.

22. The system according to claim 21, wherein said one or more circuits are further configured to detect a further security breach when said two or more instances of said unique code version identifier for corresponding ones of said prior version of executable code and said subsequent version of executable code do not match.

23. The system according to claim 18, wherein said one or more circuits are further configured to latch said corresponding unique code version identifier for corresponding ones of said prior version of executable code and/or said subsequent version of executable code in memory.

24. The system according to claim 23, wherein said one or more circuits are further configured to compare said latched corresponding unique code version identifier with a stored one time programmable (OTP) unique code version identifier that corresponds to said prior version of executable code or said subsequent version of executable code.

25. The system according to claim 24, wherein said one or more circuits are further configured to change said stored OTP unique code version identifier to match said latched corresponding unique code version identifier when said latched corresponding unique code version identifier indicates a subsequent version of executable code.

26. The system according to claim 24, wherein said one or more circuits are further configured to detect a further security breach when said stored OTP unique version identifier indicates a subsequent version of executable code.

27. The system according to claim 17, wherein said commands and a digest are embedded in one or more video and/or audio streams prior to Conditional Access (CA) scrambling by said external entity.

28. The system according to claim 27, wherein said one or more circuits are further configured to CA descramble said one or more video and/or audio streams of information comprising said embedded commands and digest on said reprogrammable security system.

29. The system according to claim 28, wherein said one or more circuits are further configured to verify said descrambled commands and digest with a key stored internally on said system.

30. The system according to claim 29, wherein said one or more circuits are further configured to latch said externally expected code version identifier from said received commands on said reprogrammable security system.

31. The system according to claim 30, wherein said one or more circuits are further configured to compare said latched externally expected code version identifier with a code version identifier internally extracted from executable code resident on said reprogrammable security system.

32. The system according to claim 31, wherein said one or more circuits are further configured to detect said security breach when said latched externally expected code version identifier does not match said internally extracted code version identifier on said reprogrammable security system.

* * * * *